March 10, 1953 E. J. J. HENRIKSEN Re. 23,629

DIVIDED CIRCULAR HANDLE HAVING INTERLOCKING MEANS

Original Filed July 5, 1946

INVENTOR.

Ernst Henriksen

BY Victor J. Evans & Co.

ATTORNEYS

Reissued Mar. 10, 1953

Re. 23,629

UNITED STATES PATENT OFFICE 23,629

DIVIDED CIRCULAR HANDLE HAVING INTERLOCKING MEANS

Ernst Johan Jens Henriksen, Copenhagen, Denmark

Original No. 2,518,006, dated August 8, 1950, Serial No. 681,563, July 5, 1946. Application for reissue August 8, 1951, Serial No. 240,888

1 Claim. (Cl. 150—12)

Matter enclosed in heavy brackets [ ] appears in the original patent but forms no part of this reissue specification; matter printed in italics indicates the additions made by reissue.

This invention relates to detachable handles for shopping bags particularly formed of net or the like, and fishing nets and the like where it is desired to hold two sides of a net or bag together for carrying or hauling, and in particular the invention relates to a handle formed in two parts with interlocking elements securing one part in the other.

The purpose of this invention is to provide an improved handle for holding two sides of a net or bag together for carrying in which the possibility of the parts of the bag separating is substantially eliminated.

In handles of this type now in use the pull of the sides of a filled net has a tendency to separate the parts of the handle and the unevenness of the strain causes inconvenience to the user. With this thought in mind this invention contemplates a net or bag handle having two parts with a tongue of one part positioned in a groove of the other securing the parts in assembled relation.

The object of this invention is to provide means for readily assembling two halves of a handle for nets, bags and the like wherein the parts are secured together for use and may readily be separated to open the bag or net.

Another object of the invention is to provide a handle having interlocking parts for holding sides of a net or bag that may readily be installed in a net or bag.

A further object of the invention is to provide a handle for nets, shopping bags and the like which is formed with detachable parts that hold together in use, which is of a simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

*Figure 1 is a vertical sectional view through the handle parts with a bag of the net type depending from said parts and with the lower part of the bag broken away.*

*Figure 2 is a side elevational view of the handle with the bag omitted.*

*Figure 3 is an exploded view showing the handle sections separated and also showing the parts in section.*

Figure 1:
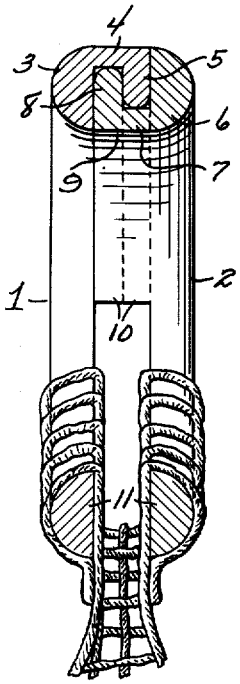
[Figure 1 is a vertical section through the handle showing the parts assembled.
Figure 3:
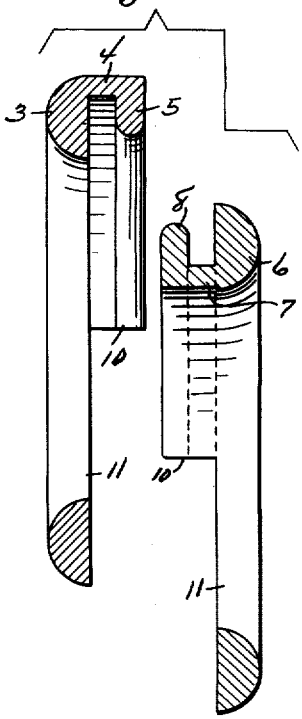
Figure 3 is an end elevational view illustrating a bag with the upper edges of the sides wedged between the sections of the handle.]

Referring now to the drawings wherein like reference characters denote corresponding parts the handle of this invention is formed in two halves 1 and 2 with the half 1 formed with an arcuate outer surface 3 and a semi-circular wall 4 having an arcuate tongue 5 extending inward from the outer edge.

The half 2 is formed with an arcuate inner surface 6 having a semi-circular inner wall 7 with an outwardly extending tongue 8 that slides under the tongue 5 of the part 1 when the parts are assembled.

Figure 2:
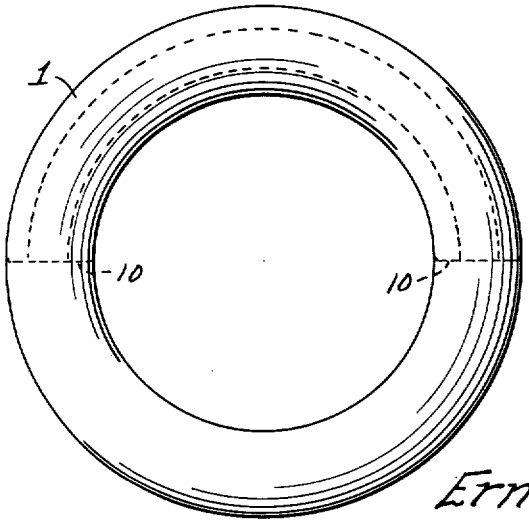
Figure 2 is a view showing a side elevation of the half of the handle carrying the tongue around the upper edge.

The handle is carried in the position as illustrated in Figures 1 and 2 with the hand contacting the under surface 9, and the lower sections of the parts, below the points 10, are free, as indicated by the numeral 11, so that the sides of a net or bag may readily be attached thereto.

With the parts arranged in this manner the sides of a net or bag are [wedged between] *attached to* the parts 11 of the sections of the handle, and after the net or bag is filled the parts are [held together and] *assembled with* the tongue 8 slid up in under the tongue 5, as shown in Figure 1 [, and after]. *After* the parts are assembled the bag may be carried with the load from both sides equalized so that an even pull is obtained, and the parts will not separate laterally or open until the part 1 is slid off of the part 2.

It will be understood that modifications may be made in the design and arrangement of the parts without departing from the spirit of the invention.

What is claimed is:

In an interlocking handle for nets, bags, and the like, the combination which comprises a pair of rings semi-circular in cross section with the flat sides thereof in [abutting] *confronting* relation, one of said rings having a semi-circular wall extending laterally from the outer edge and positioned on the upper half thereof with an inwardly disposed tongue at the outer edge thereof, and the other of said rings having a semi-circular wall extending laterally from the inner edge [thereof] with an outwardly disposed tongue on the outer edge thereof, said tongues interlocking to hold the rings in assembled relation [, with the sides of a bag or the like wedged therebetween.].

ERNST JOHAN JENS HENRIKSEN.

(References on following page)

REFERENCES CITED

The following references are of record in the file of this patent or the original patent:

UNITED STATES PATENTS

| Number | Name | Date |
|---|---|---|
| 187,779 | Schimper | Feb. 27, 1877 |
| 1,359,461 | Luce | Nov. 16, 1920 |
| 1,400,499 | Henderson | Dec. 13, 1921 |
| 1,658,174 | Russell | Feb. 7, 1928 |

| Number | Name | Date |
|---|---|---|
| 1,826,976 | Wright | Oct. 13, 1931 |
| 2,041,691 | Becklin | May 26, 1936 |
| 2,170,841 | Thies et al. | Aug. 29, 1939 |
| 2,337,580 | Webster | Dec. 28, 1943 |
| 2,349,025 | Wick | May 16, 1944 |

FOREIGN PATENTS

| Number | Country | Date |
|---|---|---|
| 215,864 | Germany | Nov. 9, 1909 |
| 704,132 | France | Feb. 17, 1931 |

Certificate of Correction

Patented March 10, 1953 Reissue No. 23,629

ERNST JOHAN JENS HENRIKSEN

It is hereby certified that it appears that a mistake has been made in the above numbered patent and a showing has been made that such mistake occurred in good faith and was not the fault of the Patent Office, said mistake requiring correction as follows:

Column 2, line 39, beginning with "In an" strike out all to and including "therebetween.]." in line 52, same column, and insert instead the following claim:

*In an interlocking handle for nets, bags, and the like, the combination which comprises a pair of rings having flat inner sides arranged in confronting relation, one of said rings having a semi-circular wall extending laterally from the outer edge and positioned on the upper half thereof with an inwardly disposed tongue at the outer edge thereof, and the other of said rings having a semi-circular wall extending laterally from the inner edge thereof with an outwardly disposed tongue on the outer edge thereof, said tongues interlocking to hold the rings in assembled relation, with the sides of a bag or the like wrapped around the lower parts of the rings and secured to provide tunnels through which the rings extend with the bag depending from the rings.*

The said patent should be read as though corrected as specified.

Signed and sealed this 17th day of November, A. D. 1953.

[SEAL]

ARTHUR W. CROCKER,
*Assistant Commissioner of Patents.*